United States Patent
Wolf

(10) Patent No.: US 9,517,797 B2
(45) Date of Patent: Dec. 13, 2016

(54) SUPPORT STRUCTURE AND METHOD OF PRODUCING A SUPPORT STRUCTURE

(71) Applicant: ZF Friedrichshafen AG, Friedrichshafen (DE)

(72) Inventor: Daniel Wolf, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/759,431

(22) PCT Filed: Nov. 18, 2013

(86) PCT No.: PCT/EP2013/074005
§ 371 (c)(1),
(2) Date: Jul. 7, 2015

(87) PCT Pub. No.: WO2014/114381
PCT Pub. Date: Jul. 31, 2014

(65) Prior Publication Data
US 2015/0353135 A1 Dec. 10, 2015

(30) Foreign Application Priority Data
Jan. 24, 2013 (DE) .................. 10 2013 201 075

(51) Int. Cl.
*B62D 21/11* (2006.01)
*B29C 53/06* (2006.01)
(Continued)

(52) U.S. Cl.
CPC ............... *B62D 21/11* (2013.01); *B29C 53/06* (2013.01); *B62D 29/041* (2013.01); *B29K 2105/20* (2013.01); *B29L 2031/30* (2013.01)

(58) Field of Classification Search
CPC ....... B26D 21/11; B26D 29/041; B29C 53/06; B29K 2105/20; B29L 2031/30
(Continued)

(56) References Cited

U.S. PATENT DOCUMENTS 5,836,712 A 11/1998 Zetterstrom
6,457,729 B2 10/2002 Stenvall
(Continued)

FOREIGN PATENT DOCUMENTS

DE 2 211 185 9/1972
DE 32 43 434 A1 5/1984
(Continued)

OTHER PUBLICATIONS

Translation of EP 2527231 A2, Leibl Peter, Nov. 28, 2012.*
(Continued)

*Primary Examiner* — Faye M Fleming
(74) *Attorney, Agent, or Firm* — Davis & Bujold, PLLC; Michael J. Bujold

(57) ABSTRACT

A support structure (1), in particular an axle support for a motor vehicle, which is made as a single-shell or multi-shell frame element (7) of fiber-reinforced plastic. The frame element (7) has at least one elastic connection point (9, 9', 9'', 9''') for connection to an aggregate such that the at least one elastic connection point (9, 9', 9'', 9''') is formed integrally with the frame element (7). Additionally, a method for producing such a support structure (1) is disclosed.

14 Claims, 2 Drawing Sheets

(51) Int. Cl.
 *B62D 29/04* (2006.01)
 *B29K 105/20* (2006.01)
 *B29L 31/30* (2006.01)

(58) Field of Classification Search
 USPC .................................................. 280/124.109
 See application file for complete search history.

(56) References Cited

U.S. PATENT DOCUMENTS

| | | | |
|---|---|---|---|
| 8,727,362 | B2 | 5/2014 | Heimann et al. |
| 2002/0153648 | A1 | 10/2002 | Lawson |
| 2006/0284449 | A1* | 12/2006 | Miyahara ............... B62D 21/11 296/204 |
| 2015/0158361 | A1* | 6/2015 | Eismann ................ B60G 7/001 280/124.116 |

FOREIGN PATENT DOCUMENTS

| | | |
|---|---|---|
| DE | 90 02 839 U1 | 5/1990 |
| DE | 197 50 225 A1 | 5/1999 |
| DE | 695 22 950 T2 | 8/2002 |
| DE | 102 11 582 A1 | 9/2002 |
| DE | 10351574 A1 * | 6/2005 ............. B62D 21/11 |
| DE | 601 19 216 T2 | 2/2007 |
| DE | 10 2011 077 336 A1 | 12/2012 |
| DE | 10 2011 083 173 A1 | 3/2013 |
| EP | 0 594 131 A1 | 4/1994 |
| EP | 0 670 257 A1 | 9/1995 |
| EP | 2 527 231 A2 | 11/2012 |
| EP | 2 578 473 A1 | 4/2013 |
| FR | 2 926 248 A1 | 7/2009 |
| GB | 1 378 796 | 12/1974 |

OTHER PUBLICATIONS

German Search Report Corresponding to 10 2013 201 075.3 mailed Aug. 8, 2013.
International Search Report Corresponding to PCT/EP2013/074005 mailed Jan. 27, 2014.
Written Opinion Corresponding to PCT/EP2013/074005 mailed Jan. 27, 2014.
International Preliminary Report on Patentability Corresponding to PCT/EP2013/074005 mailed Dec. 23, 2014.

* cited by examiner

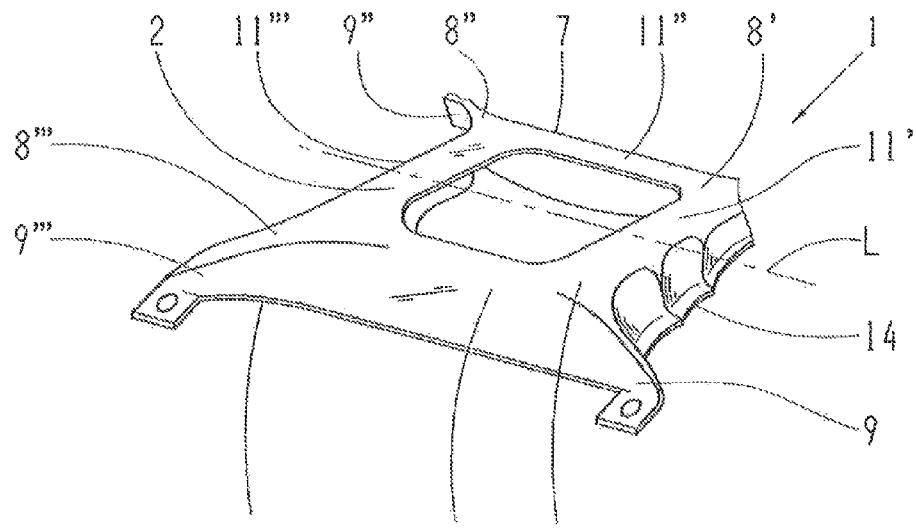
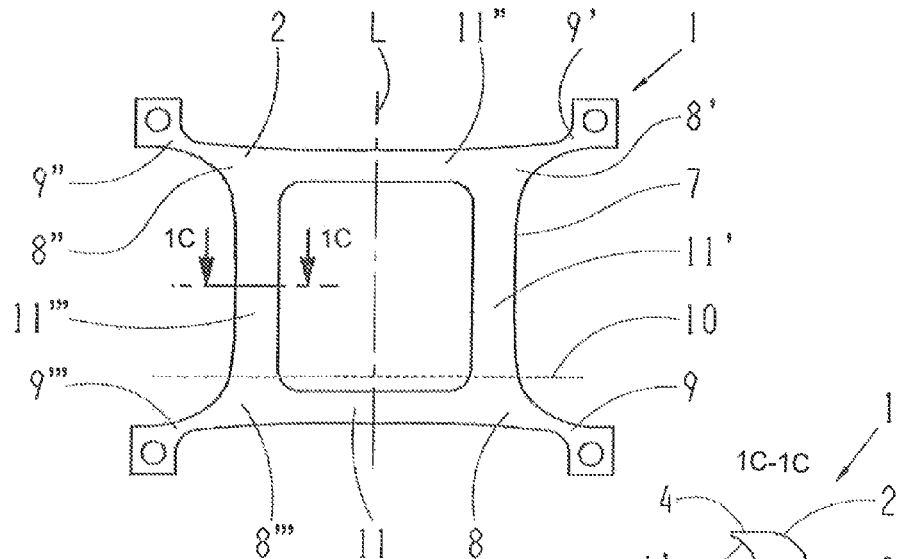
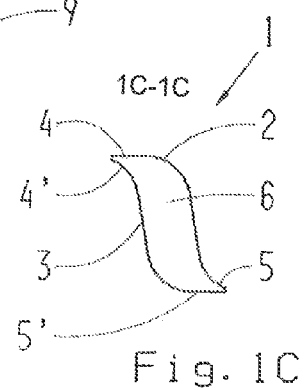

SUPPORT STRUCTURE AND METHOD OF PRODUCING A SUPPORT STRUCTURE

This application is a National Stage completion of PCT/EP2013/074005 filed Nov. 18, 2013, which claims priority from German patent application serial no. 10 2013 201 075.3 filed Jan. 24, 2013.

FIELD OF THE INVENTION

The invention concerns a support structure, in particular an axle support for a motor vehicle and a method for producing a support structure of that type.

BACKGROUND OF THE INVENTION

To hold chassis components such as control arms, suspensions, etc, motor vehicles (passenger cars and utility vehicles) comprise a support structure in the form of an axle support or auxiliary frame. This axle support distributes the loads to suitable connection points on the body and at the same time also offers an elastic decoupling of the chassis relative to the body. The elastic decoupling is particularly advantageous in relation to driving comfort and the acoustics during driving. Moreover, the axle support also serves to facilitate the fitting of the chassis as a pre-assembled module.

From the prior art axle supports are known, which consist of welded metallic structures made for example from steel sheet or cast aluminum assemblies combined with extruded sections. Furthermore, from the prior art it is also known to make axle supports from fiber-reinforced plastic.

For example, from DE 695 22 950 T3 a front and/or rear suspension assembly with a substantially Omega-shaped chassis component made from fiber-reinforced plastic is known, which is integrated in a two-shell auxiliary frame. The auxiliary frame can be made from steel, aluminum or magnesium. Alternatively, the auxiliary frame can also be made from fiber-reinforced plastic.

Until now, due to the complex requirements relating to mechanical properties such as strength and rigidity at the force transfer points of the known auxiliary frames or axle supports, there has still not been any solution for economical mass production. In that respect it is particularly problematic that the known designs require elastic mountings, for example in the form of rubber mountings, which have to be designed in such manner that they have high elasticity parallel to the longitudinal axis of the vehicle, but high rigidity perpendicular to that axis. An additional disadvantage of the known designs is, moreover, that in the case of axle supports or auxiliary frames made from fiber-reinforced plastic, during production a lot of excess material is produced at the corners, which has to be removed, in particular cut away in an additional process step.

SUMMARY OF THE INVENTION

Accordingly one objective of the present invention is to provide a support structure, in particular an axle support for a motor vehicle, which can be produced economically but which still satisfies the mechanical requirements particularly at the force transfer points of the support structure. A further objective of the present invention is to provide an appropriate production method for such a support structure.

These objectives are achieved by a support structure having the characteristics described below and a method for producing a support structure having those characteristics.

A support structure, in particular an axle support for a motor vehicle is provided, which is made as a single-shell or multi-shell frame element from fiber-reinforced plastic, wherein the frame element has at least one elastic connection point for connection to an aggregate, the at least one elastic connection point being made integrally with the frame element. By virtue of this configuration of elastic connection points made integrally with the frame element, economical production can be ensured while at the same time satisfying the strict mechanical requirements demanded from the support structure. Moreover, by designing the connection points themselves elastically, the need for additional rubber mountings is avoided, which further improves the economy of the production process since, on the one hand, costs for the additional rubber mountings can be saved and, on the other hand, an additional production step for fitting the rubber mountings can be omitted.

In a preferred embodiment the support structure comprises at least two elastic connection points, in particular four elastic connection points. The number of elastic connection points provided can be varied depending on the field of use or the requirements demanded from the support structure.

In another preferred embodiment the frame element is designed with two shells, in particular with an upper shell and a lower shell, such that between the upper and the lower shell a hollow space is formed. Alternatively, however, the frame element can also be of single-shell design with an open profile, which saves material costs and renders superfluous an additional step of joining the upper and lower shells to one another, for example by adhesive bonding.

Preferably, the frame element has a substantially S-shaped cross-section. The S-shaped design has the advantage that when the upper and lower shells are bonded together, this can take place on substantially straight surfaces.

Moreover, it is advantageous for the at least one elastic connection point to be substantially elastic in the direction of a longitudinal axis of the motor vehicle and substantially rigid in a direction perpendicular to the longitudinal axis. The high elasticity in the vehicle's longitudinal direction enables a parallel displacement backward and forward along the longitudinal axis of the vehicle, which serves to reduce the bumpiness of the chassis, for example when driving over uneven ground. In practice the displacement can be up to 6 mm. Furthermore, it should be noted that the elasticity at the elastic connection points is achieved by virtue of a small cross-section and a low area moment of inertia of the support structure in the area of the elastic connection points. In contrast, the high rigidity in the transverse direction is enabled by force transfer over the entire area, which is in the form of or acts as a compression or tension strut. This is ensured by a corresponding orientation of the fibers in a lateral surface of the support structure.

Preferably, the at least one elastic connection point is formed by folding a textile, which simplifies the production process.

Preferably, the fiber-reinforced plastic is reinforced with long-fiber and/or continuous-fiber plastic fibers (organic sheet). In particular, continuous fibers are advantageous for textile folding.

It is also advantageous for the frame element to taper down in the area of the at least one elastic connection point. In particular, in the connection area to the vehicle's body, depending on the required connection rigidity, the hollow space formed by the upper and lower shells is of tapered shape. This still further reduces the above-mentioned bumpiness of the chassis when driving over uneven ground.

In a further preferred embodiment the frame element has a substantially rectangular body with four corner sections, such that from each corner section an elastic connection point projects in the direction transverse to the longitudinal axis of the motor vehicle. In this case it is advantageous for the elastic connection points to be arranged substantially in the transverse direction of the vehicle and to project from the support structure, so that the rubber mountings used in the prior art can thereby be effectively replaced and the above-mentioned elastic properties in the longitudinal direction of the vehicle can be achieved.

However, as an alternative the frame element can have only two elastic connection points, which are then connected by a bracket-like element.

A further advantage can be achieved by forming the support structure with reinforcing elements, in particular reinforcing ribs, the reinforcing elements being made as plastic moldings of long-fiber-reinforced thermoplasts or SMC/BMG (Duroplast). This advantageously ensures that the strict mechanical demands made on the support structure can be satisfied and no premature failure of the support structure takes place. The plastic moldings can be provided on the inside and/or outside of the frame element. The textile reinforcing structure can be a scrim, a fabric, a woven material, a knitted material or a mat, and can contain quasi-continuous or cut long fibers. The textile finished product can be dry or pre-impregnated, and can contain a hybrid yarn or a binder for fixing dry layers. For the production and shaping of dry textile semifinished products, the use of thermoplastic or reactive binders, for example based on a resin component, is advantageous. As resins, thermoplasts such as polyamides (PA), polysulfones (PS), polypropylene (PP) or PEEK can be used. As Duroplasts, epoxide resins, polyurethane, vinyl ester or hybrid resin systems are suitable. As the production process, preferably hot-molding can be used for pre-impregnated semifinished products and a Liquid Composite Molding (LCM) process (RIM, RTM, etc.) can be implemented for the use of dry textile semifinished products.

In a further preferred embodiment the upper and lower shells are joined to one another by a joining method, in particular by adhesive bonding, riveting or screwing, or by welding. Welding by ultrasound, laser or vibration is particularly advantageous when thermoplastic materials are used for the support structure.

The hollow space can be filled with a low-density material, in particular a foam, honeycomb material or balsawood. During the production process this can advantageously be used in order to shape the upper and lower shells in one step.

According to the invention, in addition a method for producing a support structure is provided, the method comprising the following steps: production of a textile semifinished product or a semifinished product made of textile-reinforced plastic for forming the support structure, having a substantially rectangular body with four corner sections; deforming the textile semifinished product or semifinished product made of textile-reinforced plastic, from an initial circumference to a smaller, second circumference displaced relative to a reference plane of the textile semifinished product or semifinished product made of textile-reinforced plastic; forming folds from the areas compressed during the deformation step, in order to form two, more particularly four, elastic connection points and further force transfer points formed by the folds. This process is particularly economical, since as already described earlier, additional rubber mountings are rendered superfluous and the support structure can be made in one piece in a simple manner, since the excess material of the upper and lower shells no longer has to be cut away, but is used further for the elastic connection point(s).

Preferably, the construction of the support structure is multi-layered, the layers being fixed in intermediate steps in a so-termed pre-forming process.

BRIEF DESCRIPTION OF THE DRAWINGS

Below, an embodiment of the invention is described in greater detail with reference to the attached drawings, which show:

FIGS. 1A-1C: Various views of a support structure according to an embodiment of the invention.

DETAILED DESCRIPTION OF THE PREFERRED EMBODIMENTS

Figure 2:
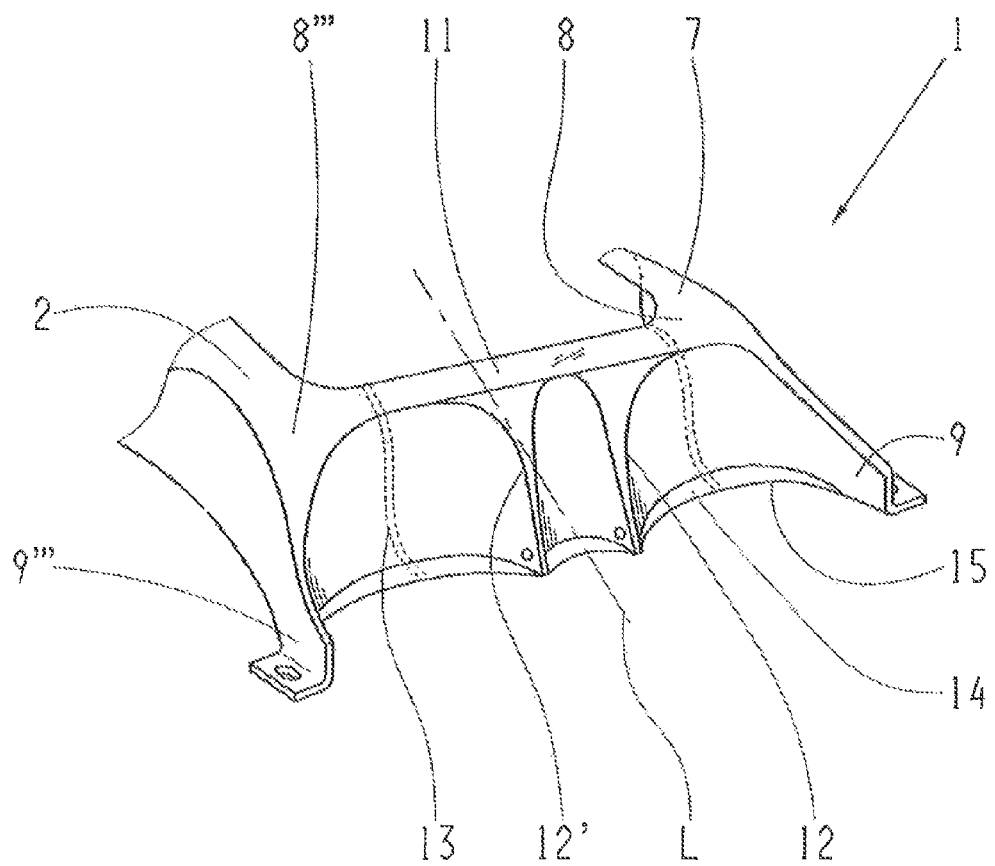
FIG. 2: A perspective view of a front portion of a support structure according to an embodiment.

FIGS. 1A to 1C show various views of a support structure 1 according to an embodiment of the invention, FIG. 1A shows a perspective view of the support structure, FIG. 1B a view of the support structure seen from above, and FIG. 1C a section along the line 1C-1C shown in FIG. 1B. The support structure 1 is an axle support or auxiliary frame for a motor vehicle. In the embodiment shown here the support structure 1 is in the form of a two-shell structure with an upper shell 2 and a lower shell 3 (see in particular FIG. 1C), the shells being firmly joined to one another to form a frame element 7. The upper shell 2 and the lower shell 3 are in each case S-shaped (in this case shown as back-to-front mirror images), so that the upper shell 2 can be joined to the lower shell 3 along their respective, substantially straight upper and lower surfaces 4, 4', 5, 5', for example by bonding. Between the upper shell 2 and the lower shell 3 a hollow space 6 is formed, which however, can also be filled with a low-density material as already described earlier. The wall thickness of the upper and lower shells 2, 3 is 4 to 5 mm. The frame element 7 is made of a fiber-reinforced plastic and has a substantially rectangular shape with four corner sections 8, 8', 8", 8''', such that from each corner section 8, 8', 8", 8''' an elastic connection point 9, 9', 9", 9''' projects in the direction transverse to the longitudinal axis L of the motor vehicle. The elastic connection points 9, 9', 9", 9''', which serve as force transfer points, are formed integrally with the frame element 7 by textile folding. By virtue of the connection points 9, 9', 9", 9' so formed, there is elasticity or flexibility in the direction of the longitudinal axis L and at the same time rigidity in the direction transverse to the longitudinal axis L.

To further reduce the bumpiness of the chassis as already described earlier, in the area of connection to the body, i.e. at the elastic connection points 9, 9', 9", 9''' the support structure 1 is formed with a taper, i.e. the hollow space 6 between the upper shell 2 and the lower shell 3 becomes narrower. The distance between the upper and lower shells 2, 3 is at most 5 mm at the tapered elastic connection points 9, 9', 9", 9'''. Along the respective elastic connection points 9, 9', 9", 9''' in the direction toward the four-cornered frame element 7, the upper shell 2 and the lower shell 3 are V-shaped over a length of 10 to 20 cm in an aperture distance of 10 cm.

In an alternative embodiment not shown in detail here, if the support structure 1 has only two elastic connections 9, 9''', then the frame component 7 would end approximately at the broken line indexed 10 in FIG. 1B, so that the elastic connection points 9, 9''' are only connected by a bracket-like element, in this case indexed 11. In contrast, in the variant with four elastic connection points 9, 9', 9", 9''' there are also four bracket-like elements 11, 11', 11", 11''', which then form the frame element 7.

By providing the elastic connection points 9, 9', 9", 9''' made integrally with the frame element 7 as described above, the provision of additional rubber mountings is superfluous. The folds 12, 12' (see FIG. 2) formed by textile folding along the edges of the support structure 1 and the likewise formed elastic connection points 9, 9', 9", 9''' serve as force transfer points by virtue of the through-going fiber structure of long or continuous fibers in the plastic of the support structure 1.

FIG. 2 shows a perspective view of a front portion of a support structure 1 according to an embodiment, in which the support structure 1 is additionally provided with reinforcing elements 13, here in the form of reinforcing ribs. The collars 14 also formed by textile folding on the underside 15 of the support structure 1 can additionally be provided with reinforcing elements. The reinforcing elements 13 can be made as plastic moldings, in particular of fiber-reinforced thermoplastics or Duroplasts.

INDEXES

1 Support structure
2 Upper shell
3 Lower shell
4, 4' Upper straight surfaces
5, 5' Lower straight surfaces
6 Hollow space
7 Frame element
8, 8', 8", 8' Corner sections
9, 9', 9", 9' Elastic connection points
10 Broken line
11, 11', 11", 11" Stirrup-like elements
12, 12' Folds
13 Reinforcing element
14 Collar
15 Underside

The invention claimed is:

1. A support structure (1) comprising:
a frame element (7) having at least one shell made of fiber-reinforced plastic;
the frame element (7) having at least one force transfer point (12, 12', 9, 9', 9", 9''') formed of folds of the frame element (7) which are formed from areas compressed during deformation, and
the at least at least one force transfer point (12, 12', 9, 9', 9", 9''') comprising:
at least two elastic connection points (9, 9', 9", 9''') facilitating connection of the frame element (7) to an aggregate,
the at least two elastic connection points (9, 9', 9", 9''') being formed integrally with the frame element (7), and
the at least one fold (12, 12') and the at least two elastic connection points (9, 9', 9", 9''') being formed by textile folding of the fiber-reinforced plastic so that the at least one fold (12, 12') extends from an edge toward a central region of the support structure (1) and the at least one fold (12, 12') having through-going fiber structure of long or continuous fibers in the fiber-reinforced plastic of the support structure (1).

2. The support structure (1) according to claim 1, wherein the frame element (7) is a two-shell assembly having an upper shell (2) and a lower shell (3) such that a hollow space (6) is formed and enclosed between the upper shell (2) and the lower shell (3).

3. The support structure (1) according to claim 1, wherein the at least one shell of the frame element (7) is a single-shell in which the frame element (7) has an S-shaped cross-section with an open profile.

4. The support structure (1) according to claim 1, wherein the at least one shell of the frame element (7) is an assembly of first and second shells, and each of the first and the second shells is shaped such that the frame element (7) has a substantially S-shaped cross-section.

5. The support structure (1) according to claim 1, wherein the at least two elastic connection points (9, 9', 9", 9''') are substantially elastic in a direction of a longitudinal axis (L) of a motor vehicle and substantially rigid in a direction perpendicular to the longitudinal axis (L).

6. The support structure (1) according to claim 1, wherein the fiber-reinforced plastic is reinforced with at least one of long-fiber and continuous fiber plastic fibers.

7. The support structure (1) according to claim 1, wherein the frame element (7) has a tapering shape in an area of the at least two elastic connection points (9, 9', 9", 9''').

8. The support structure (1) according to claim 1, wherein the frame element (7) has a substantially rectangular body with four corner sections (8, 8', 8", 8'''), and one of the at least two elastic connection points (9, 9', 9", 9''') projects from each corner section (8, 8', 8", 8''') in a direction transverse to a longitudinal axis (L) of a motor vehicle.

9. The support structure (1) according to claim 1, wherein the frame element (7) has two elastic connection points (9, 9''') which are connected by a bracket element (11).

10. The support structure (1) according to claim 1, wherein the support structure (1) is made with reinforcing ribs (13), and the reinforcing ribs (13) are made of fiber-reinforced thermoplasts.

11. The support structure (1) according to claim 2, wherein the upper shell (2) and the lower shell (3) are connected to one another by one of adhesive bonding, riveting, screwing and welding.

12. The support structure (1) according to claim 2, wherein the hollow space (6) is filled with one of a low-density material, a foam, a honeycomb material and balsa-wood.

13. A method for producing a support structure (1) having a frame element (7) which is made as either a single-shell or a multi-shell frame element of fiber-reinforced plastic, the frame element (7) has at least one elastic connection point (9, 9', 9", 9''') for connection to an aggregate, and the at least one elastic connection point (9, 9', 9", 9''') is formed integrally with the frame element (7), and the at least one elastic connection point (9, 9', 9", 9''') is formed by textile folding of the fiber-reinforced plastic, the method comprises steps of:
producing either a textile semifinished product or a semifinished product made of textile-reinforced plastic for forming the support structure (1) with the frame element (7), having at least two corner sections;
deforming the textile semifinished product or the semifinished product made of textile-reinforced plastic, from an initial, first circumference to a smaller, second circumference relative to a reference plane of the semifinished product or the semifinished product made of textile-reinforced plastic; and forming folds (12, 12', 9, 9', 9", 9''') from areas that were compressed, during the deformation step, to form four elastic connection points (9, 9', 9", 9''') and further force transfer points formed by folds (12, 12').

14. An axle support structure for a motor vehicle, the axle support structure comprising:
- a frame element having an S-shaped cross-section,
- the frame element being formed from an upper frame shell and a lower frame shell fixed to each other,
- the upper frame shell and the lower frame shell being made from fiber-reinforced plastic,
- the frame element having at least one force transfer point, and the at least one force transfer point comprising:
  - at least one fold extending from a peripheral edge toward a central region of the support structure such that the at least one fold is parallel to the S-shaped cross-section,
  - four elastic connection points for connecting the frame element to an aggregate, and
  - the four connection points being formed integrally with the frame element and formed by folded deformed compressed areas of the fiber-reinforced plastic of the upper frame shell and the lower frame shell.

\* \* \* \* \*